INVENTOR.
William R. Perry,
BY
Hood + Hahn.
ATTORNEYS

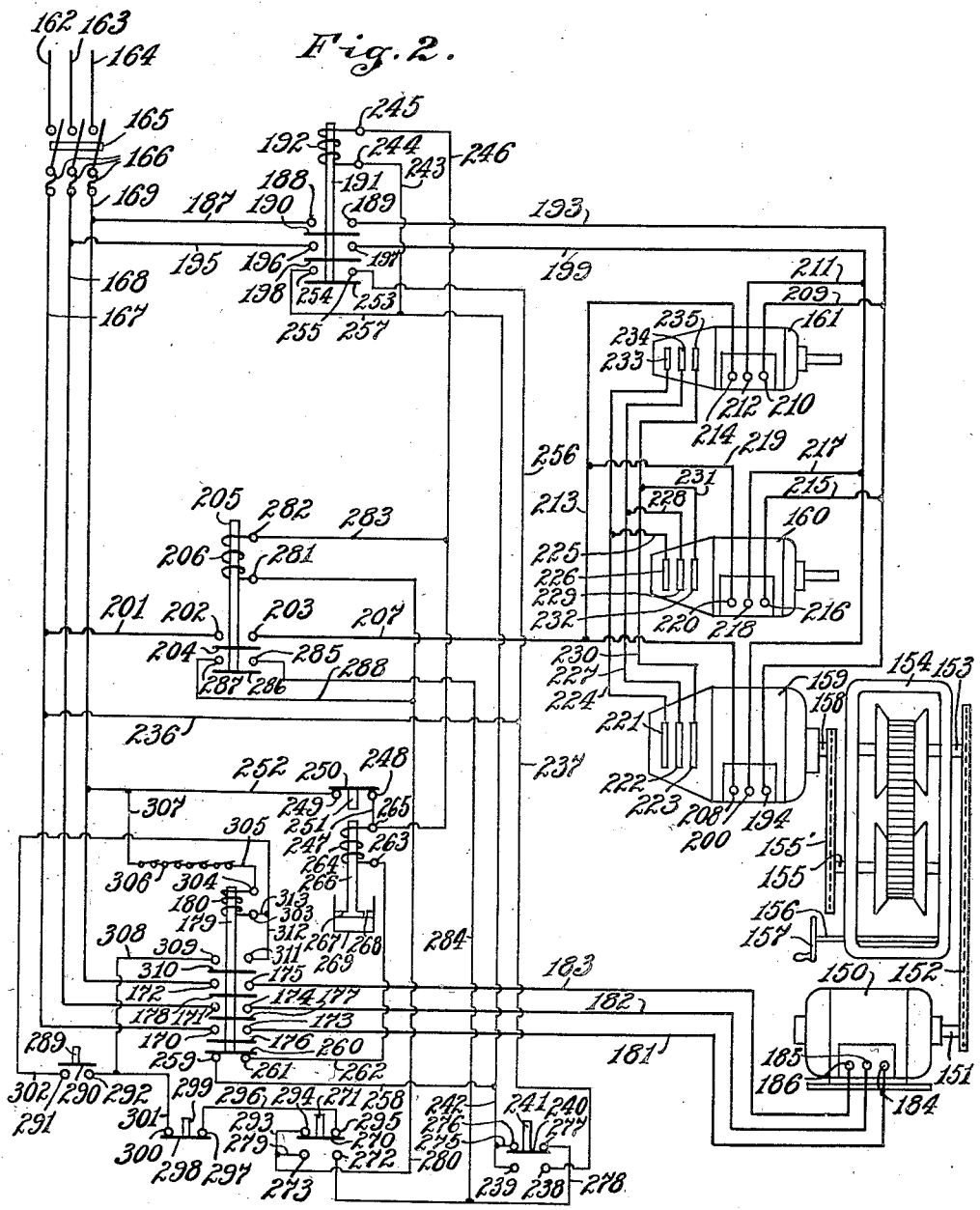

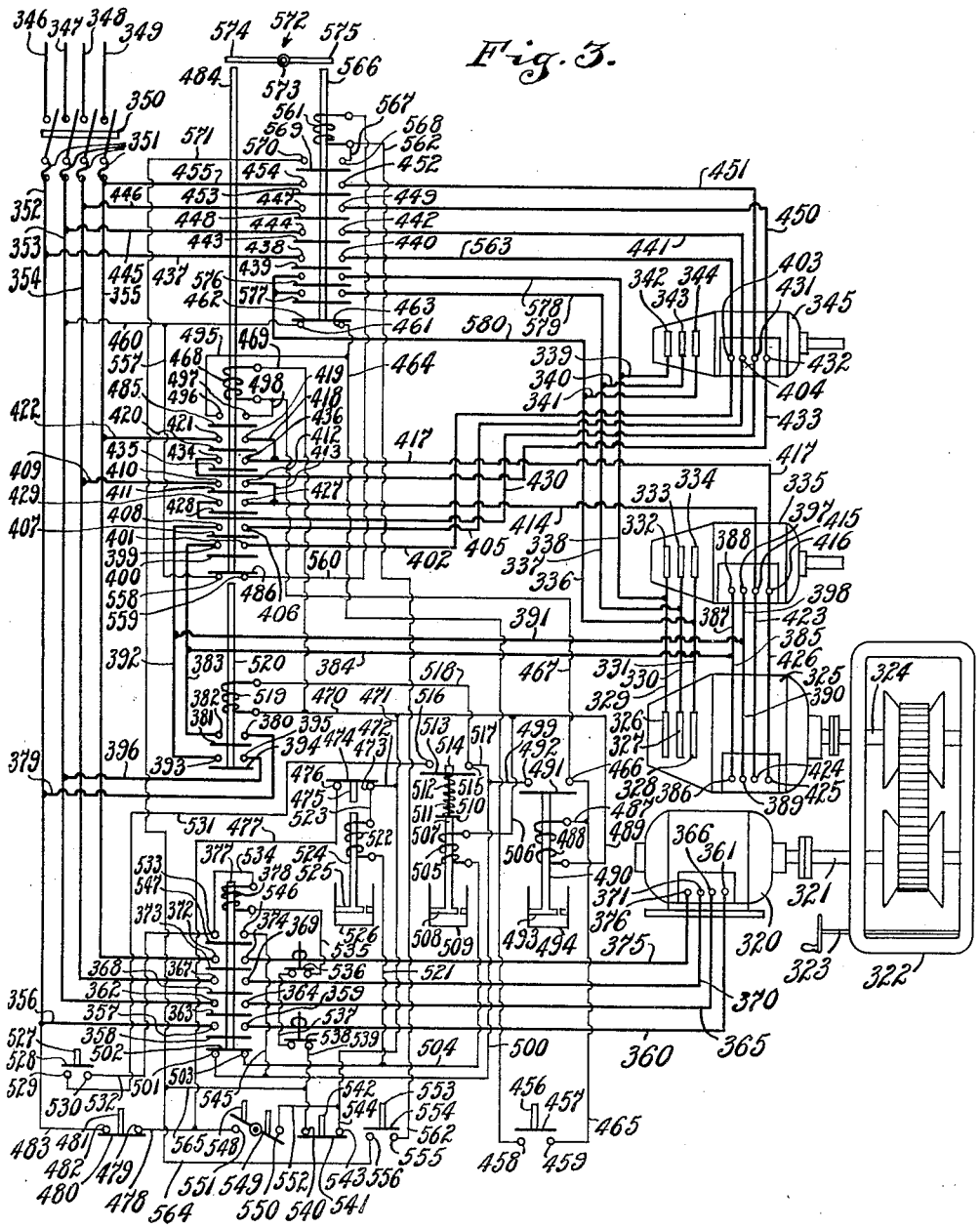

Patented Apr. 20, 1937

2,077,768

UNITED STATES PATENT OFFICE 2,077,768

SYNCHRONOUS DRIVE

William R. Perry, Columbus, Ind., assignor to Reeves Pulley Company, Columbus, Ind., a corporation of Indiana Application February 3, 1934, Serial No. 709,569

7 Claims. (Cl. 172—293)

The present application relates to synchronous drives, and more particularly to devices wherein a frequency changer is driven, at variable speed, from a suitable source of power, and wherein rotary induction machines, which may sometimes be called herein synchronous motors, are electrically "locked in step" with said frequency generator; said machines operating, therefore, at the speed of the frequency generator to drive power-receiving mechanisms.

It is an object of the prevent invention to overcome serious defects which have been inherent in organizations of this general type heretofore known. Among such defects may be noted the tendency of the induction machines to "run away" in case the operating circuits are closed at a time when the induction machines are out of step with the supposedly dominating frequency changer. It is an object of the present invention to provide means for preventing such a contingency.

In my prior Patent No. 1,757,734, issued May 6, 1930, I have provided means which tends to prevent the induction machines from getting out of step with the frequency generator. The means disclosed in that patent will hold the induction machines in step with the frequency changer until such time as all of the machines have come to a stop; and thereafter all circuits will be opened. That patent discloses nothing to prevent some possible external force from shifting the induction machines out of step with the frequency generator after the circuits have been opened. Furthermore, the device of that patent positively prevents the continued operation of the induction machines after the main power source or driving motor has been stopped. There are many instances, in industry, in which it is desirable to continue the operation of the subject machine or machines after the parent or dominating machine has been stopped; and it is an object of the present invention to provide means whereby such continued operation of the subject machines is made possible.

It is a further object of the invention to provide means for positively bringing the induction machines into step with the frequency generator before operation of the frequency generator is initiated; thereby preventing any possibility of the induction machines "running away".

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 2 is a diagrammatic illustration of a similar organization illustrating semi-automatic control means; and Fig. 3 is a diagrammatic illustration of a similar organization including fully automatic control means.

Figure 1:
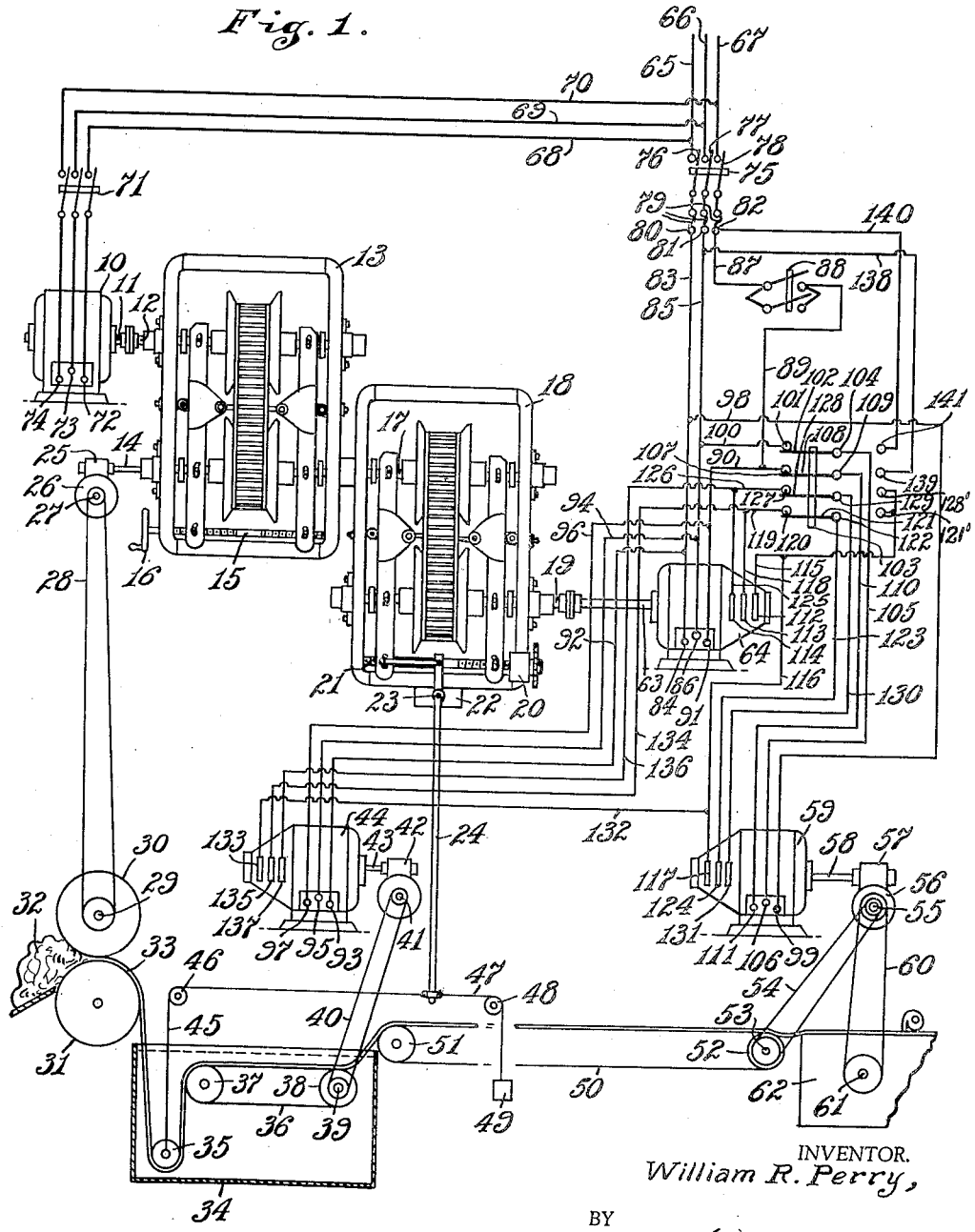
Fig. 1 is a diagrammatic view of an industrial installation including a prime mover, variable speed means through which said prime mover drives a frequency generator, and induction machines dominated by said frequency generator, for driving mechanisms auxiliary to a main mechanism driven from the main driving motor.

Referring more particularly to Fig. 1, it will be seen that I have illustrated a main driving motor 10 having spindle 11 operatively connected to drive the input shaft 12 of a variable speed transmission 13 which, in the illustrated embodiment of my invention, is of the well known "Reeves" type. Said transmission 13 includes an output or variable speed shaft 14, and a screw shaft 15, adapted to be operated by a hand-wheel 16, for varying the speed differential between the shafts 12 and 14.

The shaft 14 of the transmission 13 is, in the illustrated embodiment of my invention, operatively connected to drive the input shaft 17 of a second variable speed transmission 18 having an output shaft 19. The speed differential between the shafts 17 and 19 is under the control of a reversible pilot motor 20 connected to drive a threaded shaft 21; said motor being controlled by switch mechanism indicated at 22 and adapted to be operated by a shaft 23. The particular switch mechanism forms no part of my present invention, and consequently is not herein illustrated and described in detail. Suffice it to say that said mechanism is of such character as to effect a non-hunting control of the speed differential between the shafts 17 and 19 in response to oscillations of the shaft 23.

Said shaft 23 is under the control of a rod or lever 24 which is secured to the projecting end of said shaft.

The shaft 14 carries a worm 25 cooperating with a worm gear 26 mounted on a shaft 27 with which is associated a chain 28 driving a shaft 29 upon which is mounted a calendering roll 30. A second roll 31 cooperates with the roll 30 to compress a mass of rubber 32 into a sheet or ribbon 33. Said ribbon is fed from between the rolls 30 and 31 into a liquid-filled vat 34; and said ribbon is formed, within the vat 34, into a bight supporting a dance roll 35. Thence, the ribbon is carried upon a belt conveyor 36, mounted upon rolls 37 and 38, through and out of the vat 34. The roll 38 is mounted upon a shaft 39 which is driven, through a chain 40, from a shaft 41 which, in turn, is driven by a reducing gearing 42 associated with a shaft 43 of a rotary induction machine 44.

To the dance roll 35 is connected a cable 45 which passes upwardly over a sheave 46 and is connected to the outer end of the lever 24. A cable 47, likewise connected to the outer end of the lever 24, passes over a sheave 48 and supports a balance weight 49. Obviously, as the bight in the ribbon 33 is shortened, the outer end of the lever 24 will be shifted to the right, as viewed in Fig. 1; and, as said bight is lengthened, the outer end of said lever will be shifted to the left.

As the ribbon 33 issues from the vat 34, it is received upon a long conveyor 50 of the belt type running over rolls 51 and 52. The roll 52 is mounted upon a shaft 53 which is driven, through a chain 54, from a shaft 55; said shaft 55 carrying a worm gear 56 meshing with a worm 57 carried on the shaft 58 of a rotary induction machine 59. A second chain 60, likewise driven from the shaft 55, drives the main shaft 61 of a tread cutter illustrated diagrammatically at 62.

The variable shaft 19 of the transmission 18 is operatively connected to drive the shaft 63 of a frequency generator 64; and said frequency generator is electrically connected, in a manner hereinafter to be described, to dominate the machines 44 and 59.

In practice, the conveyor 50 of this installation is some 400 feet long. It is obviously necessary to continue the operation of said conveyor and the tread cutter 62 for a relatively long period after the last of a day's run of rubber has passed between the rolls 30 and 31. Obviously, it would be uneconomical to continue to drive the heavy rolls 30 and 31 during a long period in which those rolls will be doing no useful work. It is, therefore, desirable to provide means whereby the machine 59, and perhaps the machine 44, may be continued in operation after the motor 10 has been stopped.

Obviously, however, unless means can be provided whereby the machines 44 and 59 may be positively brought back into step with the generator 64 after such operation, such a scheme of operation would be highly impractical.

I have provided means whereby the above-mentioned economy may be practically effected.

In Fig. 1, I have indicated a source of electrical energy in the form of a three-phase alternating current electrical circuit indicated by the wires 65, 66, and 67. Wires 68, 69, and 70 lead from said line wires, respectively, through a switch 71, to the three terminals 72, 73, and 74, respectively, of the main driving motor 10.

A switch 75, having three blades 76, 77, and 78, is adapted to connect the wires 65, 66, and 67, through fuses 79, with terminals 80, 81, and 82, respectively.

A wire 83 connects the terminal 80 with one stator terminal 84 of the frequency generator 64. A wire 85 connects the terminal 81 with an intermediate stator terminal 86 of said generator 64; and a wire 87 connects the terminal 82, through a switch 88, with a wire 89, which is connected to a wire 90 leading to the third terminal 91 of said generator 64.

The stator terminals of the machine 44 are connected in parallel with the terminals 84, 86, and 91. A wire 92 connects wire 83 with terminal 93; a wire 94 connects wire 85 with terminal 95; and a wire 96 connects wire 90 with terminal 97 of said machine 44.

The stator terminals of the machine 59 may be likewise connected in parallel with the terminals 84, 86, and 91. Thus, a wire 98 connects the wire 83 with terminal 99 of said machine 59. A wire 100 leads to a contact 101 which may be connected, through one blade 102 of a switch 103, with a terminal 104 which, in turn, is connected by wire 105 with terminal 106 of the machine 59. The wire 89 leads to contact 107 which may be connected, through blade 108 of switch 103, with terminal 109 which is connected by wire 110 with terminal 111 of the machine 59.

It will thus be seen that, when the switch 88 is closed, and when the blades 102 and 108 of switch 103 are respectively in contact with contacts 101 and 107, the stators of the three machines 64, 44, and 59 will be energized through parallel circuits.

The frequency generator 64 includes slip ring contacts 112, 113, and 114. A wire 115 connects the contact 112 with a wire 116 leading to one slip ring contact 117 of the machine 59. A wire 118 connects the contact 113 with a wire 119 leading to a contact 120 which may be connected, through blade 121 of switch 103, with terminal 122 which is connected, through wire 123, with slip ring contact 124 of machine 59. A wire 125 connects the contact 114 with a wire 126 leading to a contact 127, which may be connected, through blade 128 of switch 103, with terminal 129; and a wire 130 connects said terminal 129 with the slip ring contact 131 of machine 59.

A wire 132 connects wire 116 with slip ring contact 133 of machine 44. A wire 134 connects wire 118 with a slip ring contact 135 of machine 44; and a wire 136 connects wire 125 with slip ring contact 137 of machine 44.

It will thus be seen that, when the switch 103 is in the position illustrated, the slip ring contacts 112, 113, and 114 are connected, through parallel circuits, with the slip ring contacts 117, 124, and 131, and the slip ring contacts 133, 135, and 137.

A wire 138 leads from wire 85 to a contact 139 adapted to be contacted by the blade 108 of switch 103. A wire 140 leads from terminal 82 to contact 141 adapted to be contacted by blade 102 of switch 103. When said blades 102 and 108 are moved into contact with contacts 141 and 139, terminals 81 and 82 will be connected with stator terminals 111 and 106, respectively, of the machine 59.

When the organization illustrated in Fig. 1 is to be put into operation, the switch 75 is closed, the switch 88 being in open position, and the switch 103 being in the position illustrated. Thereby, stator terminals 84 and 86 of the frequency generator 64, stator terminals 93 and 95 of the machine 44, and stator terminals 99 and 106 of the machine 59 are connected with the line wires 65 and 66, respectively. Simultaneously, slip ring contacts 112, 113, and 114 of the generator 64 are respectively connected electrically with the slip ring contacts 117, 124, and 131 of the machine 59, and with the slip ring contacts 133, 135, and 137 of the machine 44.

It will thus be seen that all of the slip ring contacts of both of the machines 44 and 59 are connected with the slip ring contacts of the generator 64, and that the stator windings of the generator 64 and of the machines 44 and 59 are energized with single phase current. I have discovered that, when those three machines are so connected and energized, the rotors of the machines 44 and 59 will be immediately jerked into step with the rotor of the generator 64 (said generator being held stationary) without any tendency to "run away" from the generator.

This action is substantially instantaneous; so that, after the operator has closed the switch 75 (the switch 103 being in the illustrated position) he may immediately close the switch 88. When the switch 88 is so closed, the stator terminals 91 of the machine 64, 97 of the machine 44, and 111 of the machine 59 are connected with the line wire 67; whereby the organization comprising said three machines is placed in condition for the desired synchronous operation. Thereafter, the operator closes the switch 71 to energize the motor 10; and the whole installation will begin operation.

After a desired cycle of operation has been completed, so far as concerns the rolls 30 and 31 and the conveyor 36, it is still necessary to continue the operation of the conveyor 50 and the machine 62 for a considerable period of time. At that moment, the operator may throw the switch 103 into its opposite position, in which the blades 102 and 108 contact the contacts 141 and 139, respectively. Thereby, the slip ring contacts 113 and 114 are disconnected from the wires 123 and 130; and so from the slip ring contacts 124 and 131 of the machine 59. At the same time, the rotor windings of machine 59 are short-circuited by contact of the switch arms 128 and 121 with the contacts 128' and 121'. It will be seen that terminal 117 is connected to contacts 128' and 121' by wire 116; terminal 124 is connected to arm 121 by wire 123; and terminal 131 is connected to arm 128 by wire 130. The stator terminals 99, 106, and 111 of said machine 59 are still energized, however, through the wire 98 and the wires 138 and 140 through the switch blades 102 and 108. Thus, the lock-in between the machine 59 and the generator 64 is broken, and the machine 59 continues to run as an induction motor.

The operator may now open the switch 88, thereby deenergizing the wire 90, and so deenergizing the stator terminal 91 of the generator 64 and the stator terminal 97 of the machine 44. The switch 71 is then opened, and the installation, with the exception of the machine 59 and the elements driven thereby, will coast to a stop.

The machine 59 will then continue to operate as an induction motor until the switch 75 is opened, or until the switch blades 102 and 108 are moved out of contact with the contacts 141 and 139.

In Fig. 2, I have illustrated an organization quite similar to the organization illustrated in Fig. 1, but in which the control is semi-automatic in character; and in which no independent operation of the rotary induction machines as independent motors is contemplated. For simplicity, I have omitted from Fig. 2 any illustration of mechanism driven by the various motors.

I have illustrated a main driving motor 150 having a shaft 151 which is connected, by a chain 152 to drive the input shaft 153 of a variable speed transmission 154 having an output or variable speed shaft 155. A control shaft 156 adapted to be operated by a hand-wheel 157 is illustrated, said control shaft being operable to vary the speed differential between the shafts 153 and 155.

A belt or chain 155' provides a driving connection between the shaft 155 and the spindle 158 of a frequency generator 159.

I have illustrated two rotary induction machines 160 and 161 suitably electrically connected with the generator 159 in a manner to be described hereinafter.

A source of three phase alternating current is indicated by the line wires 162, 163, and 164. Said line wires are adapted to be connected, through a switch 165 and fuses 166, with wires 167, 168, and 169, respectively. Said wires 167, 168, and 169 lead, respectively, to terminals 170, 171, and 172 which are adapted, at times, to be connected, respectively, to terminals 173, 174, and 175 through bridge pieces 176, 177, and 178 carried on a plunger 179 forming the core of a solenoid coil 180. The terminals 173, 174, and 175 are connected, respectively, through wires 181, 182, and 183, with the stator terminals 184, 185, and 186 of the main driving motor 150.

Obviously, when the bridge pieces 176, 177, and 178 are moved into bridging relation with the terminals 170 and 173, 171 and 174, and 172 and 175, respectively, the driving motor 150 will be energized to drive the organization.

A wire 187 leads from the wire 169 to a terminal 188 which is adapted, at times, to be electrically connected with a terminal 189 through a bridge piece 190 carried on a plunger 191 forming the core of a solenoid coil 192. A wire 193 leads from the terminal 189 to one stator terminal 194 of the frequency generator 159.

A wire 195 connects the wire 168 with a terminal 196 which, at times, is adapted to be electrically connected with a terminal 197 through a bridge piece 198 carried on the plunger 191. A wire 199 leads from said terminal 197 to a second stator terminal 200 of the generator 159.

A wire 201 connects the wire 167 with a terminal 202 which is adapted, at times, to be electrically connected with a terminal 203 through a bridge piece 204 carried upon a plunger 205 forming the core of a solenoid coil 206. A wire 207 leads from said terminal 203 to the third stator terminal 208 of the machine 159.

A wire 209 connects the wire 193 with one stator terminal 210 of the machine 161; a wire 211 connects the wire 199 with a second stator terminal 212 of said machine; and a wire 213 connects the wire 207 with the third stator terminal 214 of said machine 161. A wire 215 connects the wire 193 with a first stator terminal 216 of the machine 160; a wire 217 connects the wire 199 with a second stator terminal 218 of said machine; and a wire 219 connects the wire 213 with the third stator terminal 220 of said machine 160.

It will thus be seen that the stators of the machines 159, 160, and 161 are adapted to be energized through parallel three phase circuits.

The machine 159 is provided with slip ring contacts 221, 222, and 223. The contact 221 is connected through wires 224 and 225 to the corresponding slip ring contact 226 of the machine 160; the contact 222 is connected through wires 227 and 228 with the corresponding contact 229 of the machine 160; and the contact 223 is connected through wires 230 and 231 with the corresponding contact 232 of said machine 160. Said wires 224, 227, and 230 are continued to respective connections with the slip ring contacts 233, 234, and 235 of the machine 161. Thus it will be seen that the slip ring contacts of the machine 159 are parallel-connected with the corresponding contacts of the machines 160 and 161.

A wire 236 leads from the wire 167 to a wire 237 which, in turn, is connected with a terminal 238 adapted, at times, to be electrically connected with a terminal 239. A bridge piece 240 is associated with a push button 241, and is normally held (by means not shown) out of bridging relation with the terminals 238 and 239. A wire 242 leads from the terminal 239 to a wire 243 which, in turn, is connected to one terminal 244 of the solenoid coil 192. The opposite terminal 245 of said coil is connected by a wire 246 with a wire 247 which leads to a terminal 248. Said terminal 248 is normally electrically connected with a terminal 249 through a bridge piece 250 provided with a stem 251. A wire 252 connects the terminal 249 with the wire 169.

If the button 241 is depressed at a time when the switch 165 is closed, a circuit energizing the solenoid coil 192 will be established as follows:— Line wire 162, switch 165, wire 167, wire 236, wire 237, terminal 238, bridge piece 240, terminal 239, wire 242, wire 243, terminal 244, coil 192, terminal 245, wire 246, wire 247, terminal 248, bridge piece 250, terminal 249, wire 252, wire 169, and switch 165 to line 164.

Such energization of the coil 192 elevates the plunger 191 to bring the bridge piece 190 into bridging relation with the terminals 188 and 189; to bring the bridge piece 198 into bridging relation with the terminals 196 and 197; and to bring the bridge piece 253, likewise carried on said plunger 191, into bridging relation with associated terminals 254 and 255. Thereby, the generator 159 and the machines 160 and 161 have their stator windings energized with single phase current through circuits as follows:—Line wire 163, switch 165, wire 168, wire 195, terminal 196, bridge piece 198, terminal 197, wire 199, terminal 200, terminal 194, wire 193 (and, in parallel, through wires 211 and 217 to terminals 212 and 218, and from terminals 210 and 216 through wires 209 and 215 to wire 193), terminal 189, bridge piece 190, terminal 188, wire 187, wire 169, and switch 165 to line wire 164.

Thereby, the rotors of the machines 160 and 161 are jerked into step with the rotor of the generator 159, without any tendency to "run away".

The above noted movement of the bridge piece 253 into bridging relation with the terminals 254 and 255 establishes a holding circuit for the coil 192 as follows:—Line wire 162, switch 165, wire 167, wire 236, wire 256, terminal 255, bridge piece 253, terminal 254, wire 257, wire 243, terminal 244, coil 192, terminal 245, wire 246, wire 247, terminal 248, bridge piece 250, terminal 249, wire 252, wire 169, and switch 165 to line wire 164.

Since this holding circuit is independent of the terminals 238 and 239, the button 241 may be released immediately upon energization of the coil 192.

Simultaneously with the establishment of the initial circuit energizing the coil 192, there is established a safety circuit as follows:—Line wire 162, switch 165, wire 167, wire 236, wire 237, terminal 238, bridge piece 240, terminal 239, wire 242, wire 258, terminal 259, normally closed bridge piece 260 on plunger 179, terminal 261, wire 262, terminal 263 of solenoid coil 264, terminal 265, wire 247, terminal 248, bridge piece 250, terminal 249, wire 252, wire 169, and switch 165 to line wire 164. Energization of the coil 264 is held through the bridge piece 253 as follows:—Line wire 162, switch 165, wire 167, wire 236, wire 256, terminal 255, bridge piece 253, terminal 254, wire 257, wire 242, wire 258, terminal 259, bridge piece 260, terminal 261, wire 262, terminal 263, coil 264, terminal 265, wire 247, terminal 248, bridge piece 250, terminal 249, wire 252, wire 169, and switch 165 to line wire 164.

The core of the solenoid 264 comprises a plunger 266 carrying a piston 267 provided with a restricted aperture 268, said piston working in a fluid-filled cylinder 269. This construction delays the movement of the plunger 266. The upper end of the plunger 266 is aligned with the stem 251 of the bridge piece 250 so that, if energization of the coil 264 is continued beyond a predetermined period, said plunger will engage said stem 251 to lift the bridge piece 250 out of bridging relation with the terminals 248 and 249 to break the control circuits. It will be noted that all control circuits heretofore described have included the bridge piece 250; and, as the description proceeds, it will be seen that all intermediate control circuits hereinafter described will also include said bridge piece 250. Thus it will be seen that, unless the cycle of control operations is completed before the plunger 266 attains the upper limit of its travel, the elements of the control organization will be returned to a condition of rest.

It is to be understood that the operations of the various elements of the control organization will take place substantially instantaneously. Immediately after initial depression of the button 241, the rotors of the machines 160 and 161 will jerk in step with the rotor of the generator 159. Said button may be released immediately, and the operator will then immediately depress button 271 which carries bridge piece 270. Means (not shown) are provided for normally holding the bridge piece 270 in the position illustrated. Upon depression of the button 271, the bridge piece 270 will be moved into bridging relation with the terminals 272 and 273, thereby establishing a circuit for energizing the solenoid coil 206, as follows:—Line wire 162, switch 165, wire 167, wire 236, wire 256, terminal 255, bridge piece 253, terminal 254, wire 257, wire 242, wire 275, terminal 276, bridge piece 240, terminal 277, wire 278, terminal 272, bridge piece 270, terminal 273, wire 279, wire 280, terminal 281, coil 206, terminal 282, wire 283, wire 246, wire 247, terminal 248, bridge piece 250, terminal 249, wire 252, wire 169, and switch 165 to line wire 164. Energization of the coil 206 elevates the plunger 205 to move the bridge piece 204 into bridging relation with the terminals 202 and 203; thereby completing three phase energization of the stator windings of the machines 159, 160, and 161. The organization including the three synchronized machines is now in condition for the desired synchronous operation.

When the plunger 205 is so elevated, a bridge piece 286 carried on said plunger 205 is moved into bridging relation with a pair of terminals 285 and 287. Thereby, a holding circuit for the coil 206, independent of the terminals 272 and 273, is established as follows:—Line wire 162, switch 165, wire 167, wire 236, wire 256, terminal 255, bridge piece 253, terminal 254, wire 257, wire 275, terminal 276, bridge piece 240, terminal 277, wire 278, wire 284, terminal 285, bridge piece 286, terminal 287, wire 288, wire 280, terminal 281, coil 206, terminal 282, wire 283, wire 246, wire 247, terminal 248, bridge piece 250, terminal 249, wire 252, wire 169, and switch 165 to line wire 164.

The button 271 may now be released.

It will be noted that the circuits energizing the coils 192 and 206 are still dependent upon the bridge piece 250; and that the coil 264 is still energized. It is necessary, therefore, for the operator immediately to depress button 289 carrying bridge piece 290, whereby said bridge piece 290 is moved into bridging relation with terminals 291 and 292. Thereby, there is established a circuit energizing the coil 180, as follows:—Line wire 162, switch 165, wire 167, wire 236, wire 256, terminal 255, bridge piece 253, terminal 254, wire 257, wire 242, wire 275, terminal 276, bridge piece 240, terminal 277, wire 278, wire 284, terminal 285, bridge piece 286, terminal 287, wire 288, wire 280, wire 293, terminal 294, bridge piece 270, terminal 295, wire 296, terminal 297, bridge piece 298 of stop button 299, terminal 300, wire 301, terminal 292, bridge piece 290, terminal 291, wire 302, wire 313, terminal 303 of coil 180, terminal 304, wire 305 overload relays 306, wire 307, wire 252, wire 169 and switch 165 to line wire 164.

Energization of said coil 180 elevates the plunger 179, thereby closing the energizing circuit for the motor 150 through the bridge pieces 176, 177, and 178. Such movement of the plunger 179 breaks the energizing circuit for the coil 264 by moving the bridge piece 260 out of bridging relation with the terminals 259 and 261.

It will be seen that this energizing circuit for the coil 180 is independent of the bridge piece 250.

Such movement of the plunger 179 further establishes a holding circuit for the coil 180 independent of the bridge piece 290, as follows:— Line wire 162, switch 165, wire 167, wire 236, wire 256, terminal 255, bridge piece 253, terminal 254, wire 257, wire 242, wire 275, terminal 276, bridge piece 240, terminal 277, wire 278, wire 284, terminal 285, bridge piece 286, terminal 287, wire 288, wire 280, wire 293, terminal 294, bridge piece 270, terminal 295, wire 296, terminal 297, bridge piece 298, terminal 300, wire 301, wire 308, terminal 309, bridge piece 310, terminal 311, wire 312, wire 313, terminal 303, coil 180, terminal 304, wire 305, overload relays 306, wire 307, wire 252, wire 169, and switch 165 to line wire 164.

Immediately upon energization of the coil 180, therefore, the button 289 may be released; and the organization will continue in operation until such time as the last-traced circuit is deenergized. Such deenergization of the holding circuit may be effected by depressing the button 299, or by the opening of one or more of the contacts of the overload relay 306. Thereby the circuit between the terminals 297 and 300 is broken. When the circuit is so broken, the coil 180 is deenergized to break the operating circuit for the motor 150. When the plunger 179 drops, the bridge piece 260 closes, between the terminals 259 and 261, the circuit for energizing the coil 264. The action-delaying means associated with the plunger 266 is so calibrated as to permit the machines 150, 159, 160, and 161 to coast to a stop (the machines 159, 160 and 161 being still locked in synchronism) before the plunger 266 will break the circuits energizing the coils 192, 206, and 264, between the terminals 248 and 249.

In Fig. 3, I have illustrated diagrammatically a fully automatic control for an organization similar to the organizations illustrated in Figs. 1 and 2; having omitted therefrom any illustration of mechanism driven by the various electrical machines.

A main driving motor 320 is connected to drive the input shaft 321 of a variable speed transmission 322, said transmission including a shaft 323 for varying the speed differential between said input shaft and the output shaft 324 thereof. Said output shaft 324 is connected to drive a frequency generator 325 having the usual slip rings 326, 327 and 328. Wires 329, 330 and 331 respectively, connect to said slip rings the slip rings 332, 333 and 334 of a rotary induction machine 335. Other wires 336, 337 and 338 connect to the slip rings 326, 327 and 328, respectively, wires 339, 340 and 341 connected to the slip rings 342, 343 and 344 of a second rotary induction machine 345.

All of the machines 320, 325, 335 and 345 are wound to be energized through a polyphase four-wire system.

A source of electrical energy is indicated by the four line wires 346, 347, 348 and 349. A four-blade switch 350 is adapted to connect said line wires, through fuses 351, to wires 352, 353, 354 and 355, respectively.

A wire 356 leads from the wire 352 to a contact 357 which is adapted to be electrically connected, by a bridge piece 358, with a contact 359 which is connected, by a wire 360, with one terminal 361 of the motor 320. The wire 353 is connected to a contact 362 which is adapted to be electrically connected, by a bridge piece 363, with a contact 364 which is connected, by a wire 365, to a second terminal 366 of the motor 320. The wire 354 is connected to a contact 367 which is adapted to be electrically connected, by a bridge piece 368, with a contact 369 which is connected, by a wire 370, a third terminal 371 of said motor 320. The wire 355 is connected to a contact 372 which is adapted to be electrically connected, by a bridge piece 373, with a contact 374 which is connected, by a wire 375, to the fourth terminal 376 of the motor 320.

All of said bridge pieces 358, 363, 368 and 373 are carried upon a plunger 377 which constitutes the core of the solenoid coil 378. Said plunger 377 further carries two other bridge pieces 502 and 547.

A wire 379 leads from the wire 352 to a contact 380 which is adapted to be connected, by a bridge piece 381, with a contact 382. A wire 383 leads from said contact 382 and is connected, by a wire 384, with a wire 385 leading to a stator terminal 386 of the frequency generator 325. A wire 387 connects said wire 384 with a stator terminal 388 of the rotary induction machine 335.

A second stator terminal 389 of the machine 325 is connected, by a wire 390, with a wire 391 which leads through a wire 392, to a contact 393 adapted to be electrically connected, by a bridge piece 394, with a contact 395 which is connected, by a wire 396, with the wire 353. The corresponding terminal 397 of the rotary induction machine 335 is likewise connected, by a wire 398, with the wire 391.

The bridge pieces 381 and 394 are carried on a plunger 520 which constitutes the core of a solenoid coil 519.

The wire 383 leads to a contact 399 which is adapted to be connected, by a bridge piece 400, with a contact 401 which is connected, by a wire 402, to a stator terminal 403 of the machine 345. A second terminal 404 of said machine is connected, by a wire 405, with a contact 406 which is adapted to be connected, by a bridge piece 407, with a contact 408 to which is connected the wire 392. A wire 409 leads from the wire 354 to a contact 410 which is adapted to be connected, by a bridge piece 411, with a contact 412 to which is connected a wire 413 leading to a wire 414 which, in turn, leads to a third stator terminal 415 of the machine 335. The fourth stator terminal 416 of said machine 335 is connected, by a wire 417, with a wire 418, which leads to a contact 419. Said contact 419 is adapted to be connected, by a bridge piece 420, with a contact 421 connected, by a wire 422, with the wire 355. A wire 423 leads from the wire 414 to the third stator terminal 424 of the machine 325; and the fourth stator terminal 425 of said machine 325 is connected, by a wire 426 with the wire 417.

The wire 414 connects the wire 413 not only with the terminal 415 and the wire 423, but also with a contact 427 which is adapted to be connected, by a bridge piece 428, with a contact 429 to which is connected a wire 430 leading to the third stator terminal 431 of the machine 345. The fourth stator terminal 432 of said machine is connected by a wire 433 with a contact 434 adapted to be connected, by a bridge piece 435, with a contact 436 to which the wire 417 is connected.

The bridge pieces 400, 407, 428, 411, 435 and 420 above-mentioned, are all carried upon a plunger 484 which constitutes the core of a solenoid coil 468. Said plunger likewise carries further bridge pieces 485 and 486.

A wire 437 leads from the wire 352 to a contact 438 which is adapted to be connected, by a bridge piece 439, with a contact 440 which is connected by a wire 563, with the terminal 403 of the machine 345. The terminal 404 of said machine is connected by a wire 441, to a contact 442 which is adapted to be connected by a bridge piece 443, with a contact 444 which is connected, by a wire 445, with the wire 353. A wire 446 leads from the wire 354 to a contact 447 adapted to be connected, by a bridge piece 448, with a contact 449 which is connected, by a wire 450, with the terminal 432 of the machine 345. The terminal 431 of said machine is connected, by a wire 451, with a contact 452 which is adapted to be connected, by a bridge piece 453, with a contact 454 connected by wire 455 with the wire 355.

The bridge pieces 439, 443, 448 and 453 are all carried upon a plunger 566 which constitutes the core of a solenoid coil 561. Said plunger likewise carries bridge pieces 462, 569, 576 and 577.

When the illustrated mechanism is to be started, the starting button 456 is depressed to move the bridge piece 457 carried thereby into bridging relation with contacts 458 and 459. The other elements of the organization being in the positions illustrated, and the switch 350 being closed, such depression of button 456 will establish a circuit as follows:

Line wire 347, switch 350, wire 353, wire 460, contact 461, bridge piece 462, contact 463, wire 464, contact 458, bridge piece 457, contact 459, wire 465, contact 466, wire 467, solenoid coil 468, wire 469, wire 470, wire 471, wire 472, contact 473, normally closed bridge piece 474, contact 476, wire 477, wire 478, contact 479, normally-closed bridge piece 480, contact 482, wire 483, wire 352 and switch 350 to line wire 346. The bridge piece 474 has a depending stem 475 for a purpose later to be described; and the bridge piece 480 is carried by a button 481 which may be depressed to break any circuit flowing through the bridge piece 480.

The establishment of the above-traced circuit energizes the coil 468 to lift the plunger 484, whereby bridge pieces 485, 420, 435, 411, 428, 407 and 400 are moved into bridging relation with their respective pairs of contacts, and whereby bridge piece 486 is moved out of bridging relation with its pair of contacts 558 and 559. Such movement of said plunger establishes circuits for energizing the stators of the machines 325, 335 and 345 with single-phase current, as follows:

Line wire 348, switch 350, wire 354, wire 409, contact 410, bridge piece 411, contact 412, wire 413, wire 414, wire 423, terminal 424 of frequency generator 325, terminal 425 of said machine, wire 426, wire 417, wire 418, contact 419, bridge piece 420, contact 421, wire 422, wire 355 and switch 350 to line wire 349. This circuit energizes the stator of the machine 325. The stator of the machine 335 is similarly energized through the hot wire 414 leading to the terminal 415 thereof, the terminal 416 being connected to the above-mentioned wire 417. The stator of the machine 345 is similarly energized through the circuit leading from the hot wire 413 through wire 414, contact 427, bridge piece 428, contact 429, wire 430, terminal 431, terminal 432, wire 433, contact 434, bridge piece 435, contact 436, wire 417 to wire 418, and so back to line wire 349.

The slip rings of the three machines 325, 335 and 345 being connected together, this energization of the stator windings of said machines with single-phase current will jerk the machines 335 and 345 into step with the machine 325, without any possibility of overrunning of said machines 335 and 345.

Depression of the button 456 not only establishes the above-traced circuit for energizing the coil 468, but also establishes a parallel circuit leading from hot wire 465 through wire 487, solenoid coil 488, wire 489 to wire 471, and so, along the previously traced circuit, to line wire 346. Energization of the coil 488 tends to lift the plunger 490 which constitutes the core of said coil 488, and which carries a bridge piece 491 adapted to establish electrical contact between the contact 466 and the contact 492. At its lower end, the plunger 490 carries a piston 493 working in a fluid-filled dashpot 494. Obviously, the dashpot will delay the upward movement of the plunger 490, giving the machines 335 and 345 an opportunity to jerk into step with the machine 325 before anything else happens.

When the bridge piece 485 moves into bridging relation with its contacts 496 and 497, there is established a holding circuit for the coil 468, as follows:

Line wire 347, switch 350, wire 353, wire 460, contact 461, bridge piece 462, contact 463, wire 464, wire 495, contact 496, bridge piece 485, contact 497, wire 498, wire 467, coil 468, wire 469, wire 470, wire 471, wire 472, contact 473, bridge piece 474, contact 476, wire 477, wire 478, contact 479, bridge piece 480, contact 482, wire 483, wire 352 and switch 350 to line wire 346. The button 456 may now be released without de-energizing the coil 468.

Closure of the bridge piece 485 likewise establishes a holding circuit for the coil 488. That circuit runs from the hot wire 498 of the above circuit through wire 467, contact 466, wire 465, wire 487, coil 488, wire 489 to wire 471, and so to line wire 346.

When, after the above-mentioned delay, the bridge piece 491 moves into bridging relation with the contacts 466 and 492, there is established a circuit for energizing the coil 505, as follows:

From the hot contact 466 through bridge piece 491, contact 492, wire 499, wire 500, contact 501, bridge piece 502, contact 503, wire 504, coil 505 and wire 506 to wire 489 and wire 471, and so to the line wire 346. The core 507 of said coil 505 carries at its lower end a piston 508 working in a fluid filled dashpot 509 for delaying the action of said core. At its upper end, said core 507 carries an abutment 510 from which extends upwardly a stem 511 surrounded by a spring 512 bearing on the abutment 510 and supporting a bridge piece 513. Said stem 511 carries at its upper end an abutment 514 restraining the bridge piece 513 against upward movement relative to said stem; but it will be clear that the stem 511 may move upwardly with relation to the bridge piece 513.

Said bridge piece will be moved, after a suitable delay, into bridging relation with contacts 515 and 516 for a purpose later to be described.

Closure of the bridge piece 491 likewise energizes a circuit, parallel to that for energizing the coil 519, and which runs from the hot contact 466 through bridge piece 491, contact 492, wire 499, wire 517, contact 515, wire 518, coil 519 and wire 470 to wire 471, and so to line wire 346. Energization of the coil 519 lifts the plunger 520 to move the bridge pieces 381 and 394 into bridge relation with their respective pairs of contacts. Thereby, the energization of the stator windings of the machines 325, 335 and 345 with poly-phase current is completed through wiring previously described.

Still a third parallel circuit is energized by closure of said bridge piece 491, said circuit running from the hot contact 466 through bridge piece 491, contact 492, wire 499, wire 500, contact 501, bridge piece 502, contact 503, wire 504, wire 521, coil 522 and wire 523 to contact 473, and so to line wire 346. A plunger 524 constitutes the core of the coil 522 and carries at its lower end a piston 525 working in a fluid-filled dashpot 526. The upper end of said plunger 524 is aligned with the stem 475 of the bridge piece 474 so that, if, after he has depressed the button 456, the operator does nothing more, the plunger 524 will, after a delay of several seconds, engage said stem 475 to lift the bridge piece 474. Since all of the above-described control circuits run through the bridge piece 474, the lifting of said bridge piece 474 will, of course, break all circuits and return all of the parts to the positions in which they are illustrated.

The coils 505 and 522, with their associated parts, are so arranged and proportioned that the bridge piece 513 will move into bridging relation with its contacts 515 and 516 before the plunger 524 lifts the bridge piece 474 out of bridging relation with its contacts 473 and 476. If, before said bridge piece 474 is lifted, the operator depresses the button 527 which carries a bridge piece 528, to move said bridge piece 528 into bridge relation with its contacts 529 and 530, there will be established a circuit as follows:

From the hot contact 515 through bridge piece 513, contact 516, wire 531, contact 529, bridge piece 528, contact 530, wire 532, contact 533, wire 534, solenoid coil 378, wire 535, overload relay 536, wire 537, overload relay 538, wire 539, contact 540, normally-closed bridge piece 541 of stop button 542, contact 543, wire 544, and wire 472 to contact 473, and so to line wire 346.

Energization of the coil 378 through the above-traced circuit will lift the plunger 377 with its bridge pieces 358, 363, 368 and 373 to establish an energizing poly-phase circuit for the main motor 320 through wiring previously described. At the same time, the bridge piece 502 will be moved out of bridging relation with the contacts 501 and 503 to break the above-traced circuits through which the coils 505 and 522 are energized.

The plungers 507 and 524 now begin to drop; but their downward movement is delayed by the action of the dashpots 509 and 526. The spring 512 having been somewhat compressed, the bridge piece 513 will be maintained in bridging relation with the contacts 515 and 516 for at least a short period. Within that period, the plunger 377 will have time to move its bridge piece 547 into bridging relation with its contacts 533 and 546 to establish a holding circuit for the coil 378, independent of the bridge piece 513, as follows:

From the hot wire 499 through wire 500, wire 545, contact 546, bridge piece 547, contact 533, wire 534, coil 378, wire 535, overload relay 536, wire 537, overload relay 538, wire 539, contact 540, bridge piece 541, contact 543 and wire 544 to wire 472, and so to the line wire 346. Since this circuit is independent of both the bridge piece 513 and the bridge piece 528, the button 527 may now be released.

It will be seen that the coils 468, 519, 488 and 378 are all energized, while the coils 505 and 522 are deenergized. The motor 320, the frequency generator 325 and the rotary induction machines 335 and 345 are all properly energized, and the system is operating in a condition of equilibrium.

If, now, it is desired to stop the organization, the operator presses the button 542, thereby moving the bridge piece 541 out of bridging relation with the contacts 540 and 543, and breaking the holding circuit for the coil 378. The plunger 377 instantly drops, deenergizing the motor 320. Of course, the motor 320 does not stop instantaneously but, together with the machines 325, 335 and 345, will coast to a stop. The breaking of the circuit through the bridge piece 541 does not affect the energization of the coils 468, 519 and 488; so that the machines 335 and 345 remain locked in step with the machine 325.

As the plunger 377 drops, the bridge piece 502 is moved into bridging relation with the contacts 501 and 503 to establish circuits previously described through the coils 505 and 522. If, by any chance, the operator should change his mind within a few seconds after having pressed the button 542, he may restart the system by pressing the button 527. If, however, he does not press the button 527, the plunger 524 will, after a delay of a few seconds within which time the machines 325, 335 and 345 will coast to a stop, engage the stem 475 to lift the bridge piece 474 out of engagement with the contacts 473 and 476 to break the circuits energizing the coils 468, 519 and 488. The moment those circuits are broken, the plungers 484 and 520 will drop to break the circuits energizing the windings of the machines 325, 335 and 345, and the system will be at rest in a condition of equilibrium.

It is to be noted that, in view of the delay in breaking the locking circuits, the machines 325, 335 and 345 will come to rest in step.

It is also to be noted that the organization may be stopped, as above, either by depressing the button 542, or through the action of either overload relay 536 or 538.

If it should be desired to stop the operation of the system temporarily in such a manner as to avoid the necessity of waiting through the time delay provided by the above-described system, the operator will press the button 549 of the switch 549 before pressing the button 542. Movement of the switch 549 into bridging relation with the contacts 550 and 551 provides a shunt circuit around the bridge piece 474 for carrying the various circuits energizing the coils 468, 519 and 488. It will be remembered that the energizing circuits for all of these coils flow through the wire 471 and thence through the wire 472 and contact 473 to and across the bridge piece 474 to the contact 476, wire 477 and wire 478. With the switch 549 closed, these circuits may flow through the wire 471, wire 544, wire 552, contact 550, switch 549 and contact 551 to the wire 478, and so to the line wire 346.

Thus, with the switch 549 closed, opening of the switch 542 will break the holding circuit for the coil 378, to stop the motor 320. As above described, dropping of the plunger 377 energizes the coils 505 and 522; but operation of the plunger 524 to lift the bridge piece 474 will not deenergize the coils 468, 488 and 519, since energizing circuits for those coils may now flow through the switch 549. The motor 320 may now be started immediately, after any desired period of deenergization, simply by depressing the button 527; and without having to wait for operation of the plungers 490 and 507.

Of course, even with the switch 549 closed, depression of the button 481 will immediately deenergize all of the controlling coils, whereby the system will coast to rest without any lock-up control, and without any assurance that the machines 335 and 345 will remain in step with the machine 325.

If it is desired to operate the machine 345 as a motor, entirely independently of machines 320, 325 and 335, the operator will depress the button 553 to move the bridge piece 554 carried thereby into bridging relation with the contacts 555 and 556.

Assuming the plunger 484 to be in the position illustrated, depression of the button 553 energizes a circuit as follows:

Line wire 347, switch 350, wire 353, wire 460, wire 557, contact 558, bridge piece 486, contact 559, wire 560, coil 561, wire 562, contact 555, bridge piece 554, contact 556, wire 564, wire 565, wire 539, contact 540, bridge piece 541, contact 543, wire 544, wire 472, contact 473, bridge piece 474, contact 476, wire 477, wire 478, contact 479, bridge piece 480, contact 482, wire 483, wire 352 and switch 350 to line wire 346.

The energization of coil 561 lifts the plunger 566 which constitutes the core of said coil. Said plunger carries bridge pieces 439, 443, 448 and 453 which, upon such upward movement of the plunger, close a circuit for supplying four-wire polyphase current to the stator windings of the machine 345. The plunger 566 likewise carries bridge pieces 576 and 577 which, upon upward movement of the plunger 566, establish electrical contact between wires 578 and 579, respectively connected to slip rings 342 and 343, and wire 580 connected to slip ring 344. Obviously, so long as the plunger 566 is held in its upper position, the machine 345 will run as a motor.

The plunger 566 likewise carries a bridge piece 568 which, upon upward movement of said plunger, establishes electrical connection between the contacts 568 and 570 to provide a holding circuit for the coil 561 independent of the button 553, as follows:

Line wire 347, switch 350, wire 353, wire 460, wire 557, contact 558, bridge piece 486, contact 559, wire 560, coil 561, wire 567, contact 568, bridge piece 569, contact 570, wire 571, wire 565, wire 539, contact 540, bridge piece 541, contact 543, wire 544, wire 472, contact 473, bridge piece 474, contact 476, wire 477, wire 478, contact 479, bridge piece 480, contact 482, wire 483, wire 352 and switch 350 to line wire 346.

The last-traced circuit will hold the plunger 566 in its upper position until the button 542 or the button 481 is depressed, to break the same.

It will be noted that, when the plunger 566 is in its upper position, the control system is inoperative to lock the machines 325, 335 and 345 together, since the initial control circuit which is the first one to be closed by depression of the starting button 456, must flow through the bridge piece 462, which, when the plunger 566 is in its upper position, is out of contact with its contacts 461 and 463.

Similarly, when the machines 325, 335 and 345 are locked together, it is impossible to energize the coil 561, since the initial energizing circuit for said coil must flow through the bridge piece 486 which, when the said machines are locked together, is out of contact with its contacts 558 and 559.

To make assurance doubly sure, I prefer to provide a mechanical interlock between the plungers 484 and 566 whereby, when one of said plungers is elevated, the other is mechanically held in its lowermost position. Such interlock comprises a lever, indicated generally at 572 and pivoted intermediate its ends at 573. One arm 574 of said lever is disposed in the path of the plunger 484, and the other arm 575 is disposed in the path of the plunger 566.

It may be appropriate to note here the fact that, if the machine 325 is driven mechanically in the direction of the rotating magnetic field, the lock-in torque between that machine and the machines 335 and 345 drops off rapidly above 70% of synchronous speed, and becomes zero at synchronous speed; whereas, if the machine 325 is driven in the direction opposite to the direction of field rotation the lock-in torque increases with an increase of speed, but over-all efficiency is lower as a result of the production in the machines of a braking torque. The present invention is, of course, entirely independent of the direction of rotation of the machines 325, 335 and 345.

I claim as my invention:

1. In combination, a source of polyphase electric current, a frequency generator, means for driving said generator, a synchronous rotary induction machine, means electrically connecting the secondary windings of said generator with the secondary windings of said induction machine, at least three wires connecting the primary windings of said generator with said source, a switch controlling two of said wires, an electromagnet adapted, upon energization, to move said switch to closed position, a second switch controlling at least one other of said wires, a second electromagnet adapted, upon energization, to move said second switch to closed position, means connecting the primary windings of said induction machine with said wires at points separated from said source by said switches, a circuit for energizing said first electromagnet, a third switch in said last-named circuit, a circuit for energizing said second electromagnet, and a fourth switch in said last-mentioned circuit, said fourth switch being normally open and being controlled by a third electromagnet energizable to move the same to closed position only upon closure of said third switch by energization of said first electromagnet.

2. In combination, a source of polyphase electric current, a frequency generator, means for driving said generator, a synchronous rotary induction machine, means electrically connecting the secondary windings of said generator with the secondary windings of said induction machine, three wires connecting the primary windings of said generator with said source, a first electromagnet, a first switch dominated by said first electromagnet and controlling two of said wires and adapted to be moved to closed position by energization of said first electromagnet, an energizing circuit for said first electromagnet, a second electromagnet, a second switch dominated by said second electromagnet and controlling the third wire and adapted to be moved to closed position by energization of said second electromagnet, an energizing circuit for said second electromagnet, means connecting the primary windings of said induction machine with said three wires at points separated from said source by said switches, and a third switch connected in the energizing circuit for said second electromagnet and dominated by said first electromagnet, said third switch being moved to closed position by energization of said first electromagnet.

3. In combination, a source of polyphase electric current, a frequency generator, means for driving said generator, a synchronous rotary induction machine, means electrically connecting the secondary windings of said generator with the secondary windings of said induction machine, three wires connecting the primary windings of said generator with said source, a first electromagnet, a first switch dominated by said first electromagnet and controlling two of said wires and adapted to be moved to closed position by energization of said first electromagnet, an energizing circuit for said first electromagnet, a second electromagnet, a second switch dominated by said second electromagnet and controlling the third wire and adapted to be moved to closed position by energization of said second electromagnet, an energizing circuit for said second electromagnet, means connecting the primary windings of said induction machine with said three wires at points separated from said source by said switches, a third switch connected in the energizing circuit for said second electromagnet and dominated by said first electromagnet, said third switch being moved to closed position by energization of said first electromagnet, a third electromagnet, an energizing circuit for said third electromagnet and including said third switch, and a fourth switch normally closed and connected in all of said energizing circuits, said third electromagnet being operable, upon the expiration of a predetermined length of time after energization thereof, to open said fourth switch.

4. In combination, a source of polyphase electric current, a frequency generator, a synchronous rotary induction machine, means electrically connecting the secondary windings of said generator with the secondary windings of said induction machine, three wires connecting the primary windings of said generator with said source, a first electromagnet, a first switch dominated by said first electromagnet and controlling two of said wires and adapted to be moved to closed position by energization of said first electromagnet, an energizing circuit for said first electromagnet, a second electromagnet, a second switch dominated by said second electromagnet and controlling the third wire and adapted to be moved to closed position by energization of said second electromagnet, an energizing circuit for said second electromagnet, means connecting the primary windings of said induction machine with said three wires at points separated from said source by said switches, a third switch connected in the energizing circuit for said second electromagnet and dominated by said first electromagnet, said third switch being moved to closed position by energization of said first electromagnet, a third electromagnet, an energizing circuit for said third electromagnet and including said third switch, a fourth switch normally closed and connected in all of said energizing circuits, said third electromagnet being operable, upon the expiration of a predetermined length of time after energization thereof, to open said fourth switch, an electric motor for driving said generator, a circuit for energizing said motor, a fifth switch in said motor circuit, a fourth electromagnet dominating said fifth switch and adapted, upon energization, to close said fifth switch, and a normally closed sixth switch connected in the energizing circuit for said third electromagnet and dominated by said fourth electromagnet and adapted to be moved to open position upon energization of said fourth electromagnet.

5. In combination, a source of polyphase electric current, a frequency generator, means for driving said generator, a synchronous rotary induction machine, means electrically connecting the secondary windings of said generator with the secondary windings of said induction machine, three wires connecting the primary windings of said generator with said source, a first electromagnet, a first switch dominated by said first electromagnet and controlling two of said wires and adapted to be moved to closed position by energization of said first electromagnet, an energizing circuit for said first electromagnet, a second electromagnet, a second switch dominated by said second electromagnet and controlling the third wire and adapted to be moved to closed position by energization of said second electromagnet, an energizing circuit for said second electromagnet, means connecting the primary windings of said induction machine with said three wires at points separated from said source by said switches, a third switch connected in the energizing circuit for said second electromagnet and dominated by said first electromagnet, said third switch being moved to closed position by energization of said first electromagnet, a fourth switch normally closed and connected in all of said energizing circuits, and an electrically-actuated time-delay relay having an energizing circuit including said third switch and operable, after a predetermined period of energization, to open said fourth switch.

6. In combination, a source of electric current, an electric motor, a frequency generator driven by said motor, and a synchronous rotary induction machine having its secondary windings electrically connected to the secondary windings of said generator, means operable, at times, to short-circuit said windings of said induction machine, a circuit for supplying current from said source to said motor, a first switch mechanism dominating said motor circuit, a first electrically actuated means operable, upon energization, to move said first switch mechanism to circuit-closing position, parallel circuits for supplying current from said source to the primary windings of said generator and of said induction machine, a second switch mechanism dominating said parallel circuits, a second electrically actuated means operable, upon energization, to move said second switch mechanism to circuit-closing position, a circuit for supplying current from said source to the primary windings of said induction machine only, a third switch mechanism dominating said circuit, a third electrically actuated means operable, upon energization, to move said third switch to circuit-closing position, and means preventing energization of said first electrically actuated means and preventing energization of said second electrically actuated means when said third electrically actuated means is energized.

7. In combination, a source of electric current, an electric motor, a frequency generator driven by said motor, and a synchronous rotary induction machine having its secondary windings electrically connected to the secondary windings of said generator, means operable, at times, to short-circuit said windings of said induction machine, a circuit for supplying current from said source to said motor, a first switch mechanism dominating said motor circuit, a first electrically actuated means operable, upon energization, to move said first switch mechanism to circuit-closing position, parallel circuits for supplying current from said source to the primary windings of said generator and of said induction machine, a second switch mechanism dominating said parallel circuits, a second electrically actuated means operable, upon energization, to move said second switch mechanism to circuit-closing position, a circuit for supplying current from said source to the primary windings of said induction machine only, a third switch mechanism dominating said circuit, a third electrically actuated means operable, upon energization, to move said third switch to circuit-closing position, a circuit for energizing said first electrically actuated means, said circuit including a switch moved to open position by energization of said third electrically actuated means, and including also a switch moved to closed position by energization of said second electrically actuated means, a circuit for energizing said second electrically actuated means, and including a switch moved to open position by energization of said third electrically actuated means, and a circuit for energizing said third electrically actuated means and including a switch moved to open position by energization of said second electrically actuated means.

WILLIAM R. PERRY.